United States Patent [19]

Tomlinson

[11] 4,167,736
[45] Sep. 11, 1979

[54] FLUID FLOW MEASUREMENT

[75] Inventor: Hugh F. D. Tomlinson, Oswaldtwistle, England

[73] Assignee: Elektroflo Systems Limited, Blackburn, England

[21] Appl. No.: 786,568

[22] Filed: Apr. 11, 1977

[30] Foreign Application Priority Data

Apr. 9, 1976 [GB] United Kingdom ............... 14567/76

[51] Int. Cl.$^2$ .......................... G01F 1/66; G01S 9/02; H01Q 1/04
[52] U.S. Cl. .............................. 343/5 NA; 73/194 E; 343/719
[58] Field of Search ............ 343/7 ED, 8, 5 NA, 709, 343/719; 137/50; 73/194 E

[56] References Cited

U.S. PATENT DOCUMENTS

| | | | |
|---|---|---|---|
| Re. 28,686 | 1/1976 | Coulthard | 73/194 E |
| 1,377,129 | 5/1921 | Hahnemann | 343/719 X |
| 3,482,370 | 12/1969 | Brueckmann | 343/719 X |
| 3,547,540 | 12/1970 | Shigemoto | 343/8 X |
| 3,550,070 | 12/1970 | McLeod, Jr. | 343/8 X |
| 3,551,794 | 12/1970 | Heyden et al. | 73/194 E X |
| 3,584,956 | 6/1971 | Hines et al. | 343/8 X |
| 3,852,743 | 12/1974 | Gupta | 343/8 |
| 3,891,869 | 6/1975 | Scarpa | 73/194 E X |
| 4,019,038 | 4/1977 | Critten et al. | 73/194 E X |
| 4,019,562 | 4/1977 | Shiraiwa et al. | 343/7 ED X |

Primary Examiner—Malcolm F. Hubler
Attorney, Agent, or Firm—Young & Thompson

[57] ABSTRACT

A dielectric aerial is disposed in contact with a dielectric liquid, and projects microwave radiation thereinto. The reflected radiation is received by the aerial, and the flow rate of the liquid given by the Doppler frequency shift between the projected and the reflected radiation. A control circuit is arranged to vary the flow rate in response to the Doppler signal.

26 Claims, 10 Drawing Figures

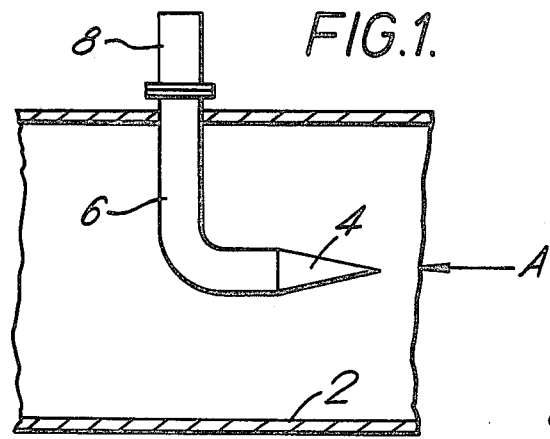
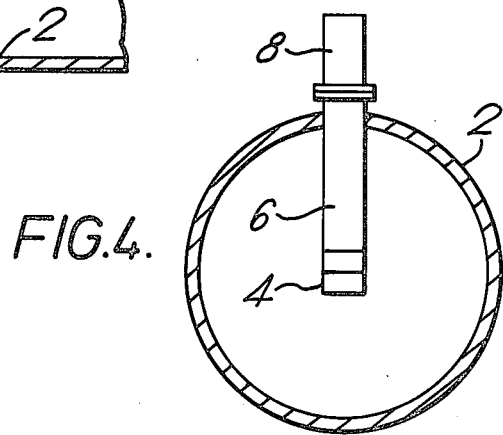
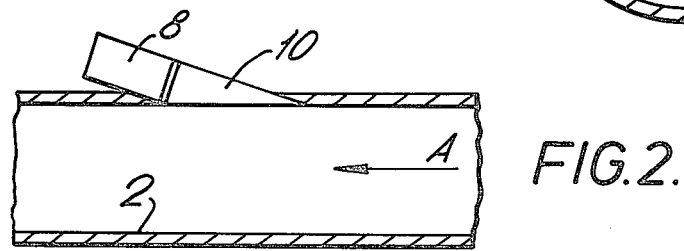
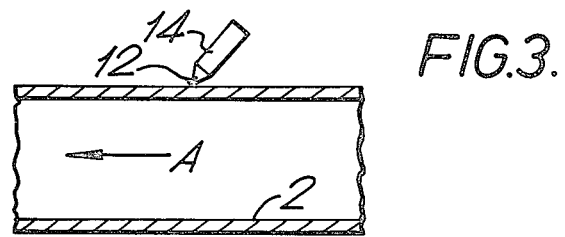

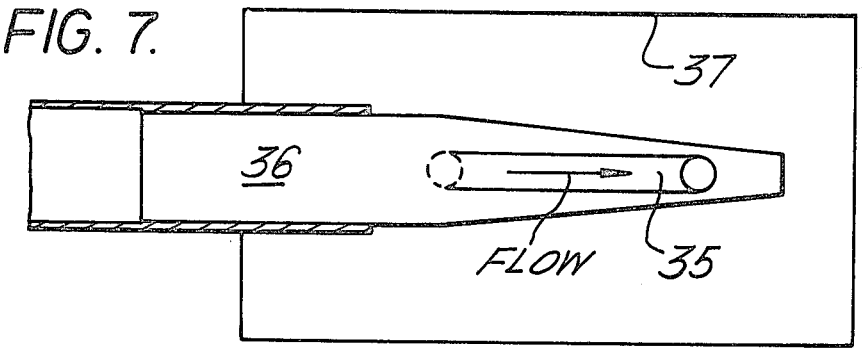
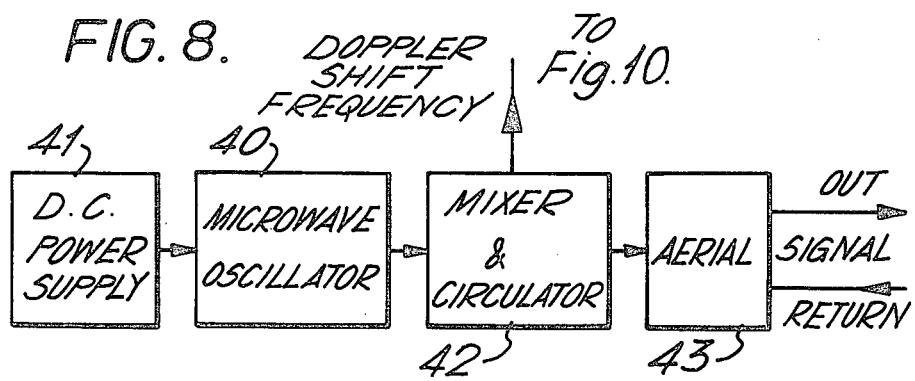
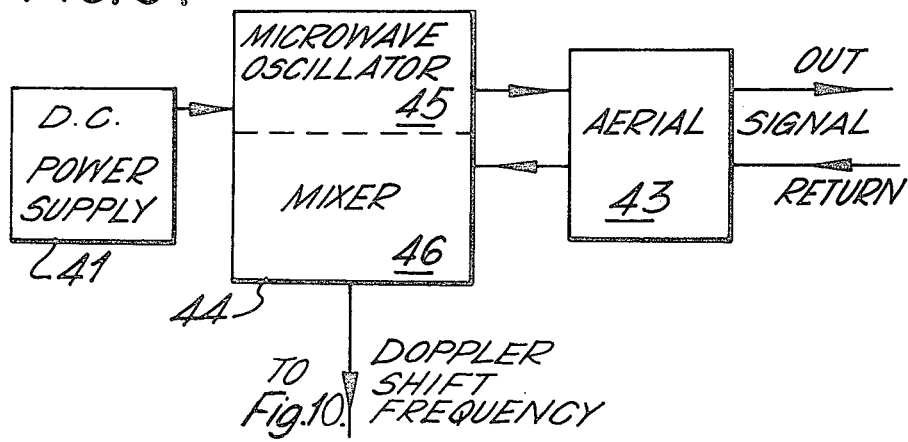

FLUID FLOW MEASUREMENT

This invention relates to the measurement of fluid flow.

The invention has application, for example, in the determination of the flow rate of a fluid through a pipe.

Mechanical methods of fluid flow measurement are known, but these have the disadvantage of a serious reduction in accuracy as the flow rate is reduced to very low values. Ultrasonic techniques have also been used, but can be rather unreliable, particularly in the presence of bubbles in the fluid. Furthermore, any external noise, for example banging on the pipe carrying the fluid, can adversely affect the results obtained.

In accordance with the present invention, there is provided a method of monitoring the flow of fluid, comprising the steps of generating a microwave frequency electrical signal, passing the signal to an aerial for radiation into the fluid, detecting said radiated signal after reflection by the fluid, determining from the radiated and reflected signals the Doppler frequency shift therebetween as a meassure of the fluid flow rate.

The invention also provides an apparatus for measuring fluid flow rate, the apparatus comprising a dielectric aerial arranged to pass microwave signals therein into fluid flowing in a fluid receiving means and to receive signals reflected from the fluid for providing a Doppler frequency signal as a measure of the fluid flow rate.

The microwave aerial may be a dielectric aerial, and when applied to fluid flow measurement in a pipe, serving as both a radiating and receiving element, may be disposed either entirely within the pipe or mounted at the side wall of the pipe. Alternatively, the aerial, not necessarily of dielectric type, may be disposed outside the pipe and arranged to transmit radiation thereto and receive radiation therefrom.

When a dielectric aerial is employed, it is important that there be a sufficiently large difference between the dielectric constants of the aerial and the fluid flowing in the pipe so as to provide a strong reflected signal, that is to say, so as to provide a good signal-to-noise ratio. Accordingly, the material from which the aerial is made is chosen having regard to the dielectric constant of the fluid with which it is to be used. Suitable materials are plastics, for example polypropylene, nylon, glass, mica. It will be seen, therefore, that a dielectric aerial can only be employed in a system where the fluid to be monitored is itself a dielectric.

The shape of the aerial is dependent on the electrical characteristics of the particular fluid being monitored, and also on the shape of the cross-section of the pipe being used.

The present invention provides a system that maintains its accuracy at flow rates relative to the aerial of almost zero.

Embodiments of the invention will now be described, by way of example, with reference to the accompanying drawings, in which:

FIGS. 1 to 3 are each schematic side views showing a different form of apparatus embodying the invention.

FIG. 4 is an end view in the direction of arrow A of FIG. 1;

FIGS. 7 and 8 show two embodiments wherein fluid flow is directed through aerials;

FIGS. 9 and 10 show in block schematic form two electrical circuits for generating microwave signals to be propagated by an aerial; and FIG. 11 shows schematically an electronic circuit for analysing the Doppler signal received by an aerial.

Figure 5:
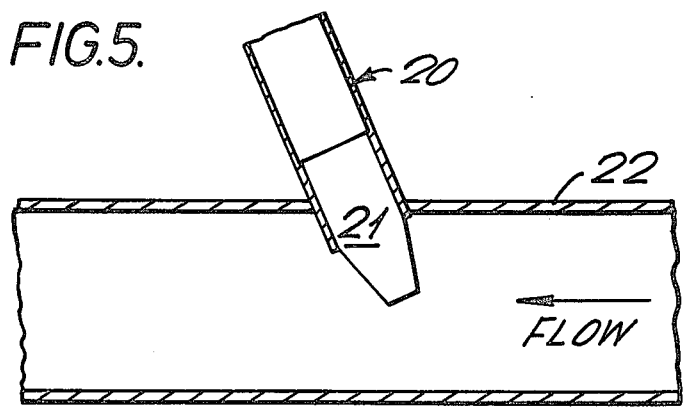
FIGS. 5 and 6 show two further embodiments of aerials and their mountings.

Referring to FIGS. 1 and 4, a pipe 2 contains fluid flowing in the direction of the arrows A. A wedge-shaped aerial 4 is mounted within the pipe 2 and disposed substantially centrally thereof pointing into the fluid flow. The aerial 4 communicates with a wave guide 6 that passes out through the pipe wall and into a Doppler module microwave cavity 8 for generating microwaves. Associated electronic detection circuitry (FIG. 11) may include indicators of flow condition and/or flow control circuitry.

The aerial 4 is a dielectric aerial which is arranged to refract the microwaves from the guide 6 so as to emit a beam of substantially parallel microwaves into the fluid. Since most liquids attenuate microwave energy severely, such a system gives rise to Doppler reflection only at the interface between the aerial and the liquid. Accordingly, this system provides a localised measurement without the interference of reflection from distant objects. Should, however, a fluid be used that is relatively transparent to microwaves, then suitable shielding may be provided to ensure that the microwaves detected, on reflection, by the aerial 4 are only those resulting from the initial parallel aligned beam.

Referring to FIG. 2, a dielectric aerial 10 is disposed in the pipe 2 such that its lower wedge surface is aligned with the pipe wall and exposed to the fluid flow. In this arrangement, only one surface of the aerial is in contact with the fluid in the pipe. In this arrangement, the aerial is connected straight into the Doppler Module 8.

FIG. 3 shows a dielectric aerial 12 disposed completely outside the flow pipe 2, so that it is not in physical contact with the fluid. The aerial 12 is connected to a Dopple Module 14. With such an arrangement, the material of the pipe 2 has to be such that no, or little, attenuation of the microwaves takes place. Plastics, e.g. nylon, material is suitable for this purpose.

The system of FIG. 3 relies upon reflections from the fluid moving through the pipe 2 for the generation of the Doppler signal. Certain flow conditions within the pipe 2 give rise to difficulties with this arrangement. The arrangement has, however, been found to work for nonhomogeneous liquids where impurities exist close to the surface, for example air bubbles within the liquid.

Although the aerial 12 is preferably a dielectric aerial, since it is not in contact with the fluid flowing in the pipe 2, other microwave aerials, such as a horn, may be used. With such other aerials not having the focussing property of dielectric aerials, shielding has to be provided to prevent detection of signals that do not arise from fluid flow in the pipe.

The passage of fluid with respect to the surface of the aerial generates a Doppler signal whose frequency is directly proportional to the rate of flow of the fluid. The signal can then be processed to provide a direct indication of the flow rate, and, if the cross-sectional area of the pipe is known, the total volume of fluid passing through the pipe in a given time can be determined.

In FIG. 5, a waveguide or other metal surround 20 is based at one end by a dielectric aerial 21, and is disposed to project through the wall 22 of a pipe into the direction of fluid flow as indicated by the arrow A.

Aerial arrangements of the general form shown in FIG. 5 and, for example, can also be used for the precision measurement of flow parameters of small quantities of liquids.

Figure 6:
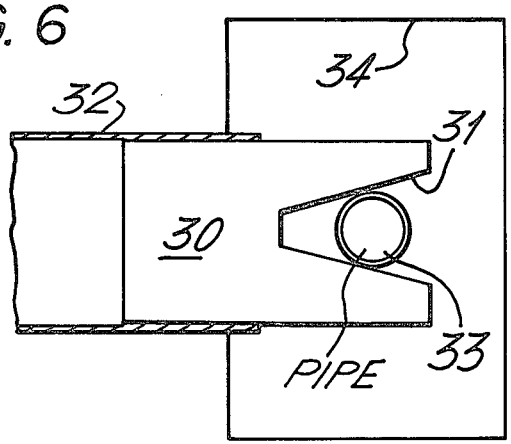

In FIG. 6, a dielectric aerial 30 having a recess 31 is mounted so as to close one end of a waveguide 32. The pipe 33 carrying the liquid whose flow rate is to be determined is mounted within the recess 31. The aerial 30 and the enclosed portion of the pipe 33 is disposed within an anechoic chamber 34 so as to localise the propagation of microwave radiation from the aerial 30.

The liquid can be arranged to flow through the aerial, which itself then becomes part of the piping. Two examples of such arrangements are shown in FIG. 7.

In FIG. 7, a bore 35 extends through an aerial 36 for transmitting the fluid from one side of the aerial to another in physical contact therewith. That is to say, the aerial acts as a conduit for the fluid to be measured. The outer radiating surface of the aerial 36 is enclosed within an anechoic chamber 37, as before.

The dielectric aerials described with reference to FIGS. 1 to 7 are particularly advantageous in determining the flow rate of fluid through a closed pipe. Since the aerials are solid bodies that seal the ends of the waveguide, it is possible for them to be immersed in the fluid. However, it is envisaged that, for measurement of fluid flow in an open channel, for example a river, a horn aerial may be employed.

Generation of microwave radiation, its communication to an aerial, and subsequent receipt and analysis will now be discussed with reference to FIGS. 8 to 10.

FIG. 8 shows a microwave generation circuit, wherein a microwave oscillator 40 is energised from a D.C. power supply 41. The microwave oscillations are passed from the oscillator 40 to a combined mixer and circulator (a junction circulator) 42 and thence to an aerial 43 for propagation into the fluid. After reflection at the interface of the aerial and fluid, the signal received by the aerial 43 is directed to the third port of the circulator 42 for analysis by the circuitry of FIG. 10. FIG. 9 shows an alternative circuit to that of FIG. 8, wherein the power supply 41 energises a combined oscillator and mixer unit 44 consisting of two adjacent cavities 45, 46 for the oscillator and mixer respectively. By careful matching of the aerial 43 to the unit 44, use of a circulator can be eliminated It will be appreciated that the aerial 43 need not be a dielectric aerial.

Figure 10:
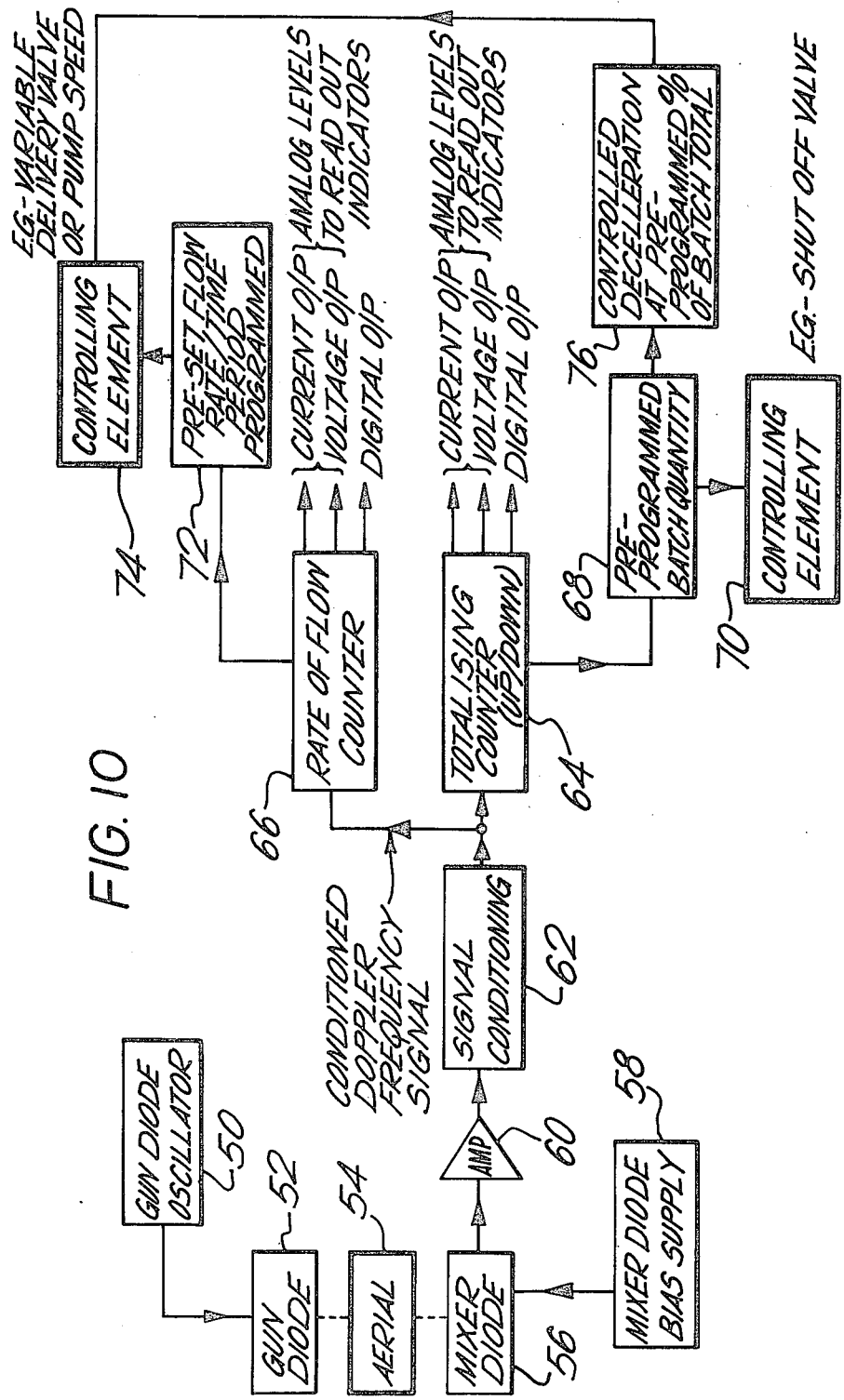

Referring now to FIG. 10, a Gunn diode oscillator 50 controls a gun diode 52 for supplying the microwave oscillations to an aerial 54. Upon receipt of the reflected radiation, the incoming radiation is passed to a mixer diode 56, forming part of a circuit for obtaining flow rate information from the incoming Doppler shifted signal. The diode 56 is biased by a supply 58, and the diode output signal is amplified by amplifier 60 before being passed to a conditioning circuit 62. The circuit 62 converts the Doppler shifted signals into digital form and suplies them to a summation UP/DOWN counter 64. The counter 64 provides a first output in digital form, and also analogue outputs for read-out indicators, showing the total amount of fluid that has passed through the region covered by the aerial. The output from the signal conditioning circuit 62 is also passed to a counter 66, which provides digital and analogue outputs for display representative of the instantaneous rate of flow of the fluid.

A control circuit may also be incorporated, and may be effective to control one or both of the parameters counted by the counters 64 and 66. Circuitry for controlling both the total amount of fluid flow and also the instantaneous rate of fluid flow is also shown in FIG. 10.

The value noted by the counter 64 is passed to a comparator 68, and therein it is compared with a pre-programmed vlue. When the summation counter 64 reaches equality with the pre-programmed value, the comparator 68 energises a control element 70, which may be a shut-off valve, for stopping the flow of fluid. Similarly, the rate-of-flow counter 66 is arranged to supply its output to a comparator 72, for comparison with a pre-set flow rate. The comparator 72 energises a control element 74, for example a valve for varying the delivery of the fluid, or a speed control of a pump for the fluid, to maintain the flow rate below a pre-set value, above a pre-set value, or within pre-set limits. Additionally, the output of the comparator 68 may be arranged to supply an output to a circuit 76 whenever the total in the summation circuit 64 exceeds a predetermined percentage of the pre-programmed total value. The circuit 76 is then operable on the control element 74 to effect a controlled deceleration of the flow rate. This latter control is particularly useful in applications where the aerial system is monitoring the flow of liquid through a filler pipe for a container. Overfilling can be avoided by slowing down the delivery rate as the final quantity to be deposited in the container is approached.

The direction of flow can be determined from the direction of the Doppler shift, and since the summation counter 64 is an UP/DOWN counter, this can be arranged to provide an indication of the flow direction.

Furthermore, it is envisaged that the system of the invention can be applied to the determination of the rate of flow of solids in suspension in a fluid, whereby the interface between the solids and the fluid provides the reflective surface for the radiation emitted by the aerial. On such applications, it is assumed that the flow rate of the solids is equal to that of the liquid.

Other applications of this method and system are envisaged, for example where the relative flow between aerial and fluid arises from movement of the aerial rather than, or in addition to, movement of the fluid. One such application is in the determination of the speed of a boat moving through water.

It should be noted, that in applications involving the transmission of the microwave radiation from the aerial through the wall of a pipe, or other means receiving the fluid, as shown in FIG. 3 for example, it is essential that the pipe be made of a dielectric material. However, where the aerial propagates the microwaves directly into the fluid, as shown in FIGS. 1 or 2 for example, there is no such restriction on the pipe material.

What I claim is:

1. A method of monitoring the flow of fluid, comprising the steps of mounting a dielectric microwave aerial in direct contact with the fluid, generating a microwave frequency electrical signal, passing the signal to the aerial for radiation into the fluid in a direction having a substantial component parallel to the direction of relative movement between the aerial and the fluid, receiving said radiated signal at said aerial after reflection by the fluid, and determining from the radiated and reflected signals the Doppler frequency shift therebetween as a measure of the fluid flow rate.

2. A method according to claim 1, wherein the aerial is completely immersed in the fluid.

3. A method according to claim 1, wherein the aerial is arranged to enclose at least part of the flow path of the fluid.

4. A method according to claim 3, wherein the flow path of the fluid is arranged to be along a passageway extending through the aerial.

5. A method according to claim 1, wherein the microwave signals are passed to said aerial directly from an oscillator, and the reflected signals are received by a mixer directly from said aerial.

6. A method according to claim 1, wherein said fluid flow rate is compared with at least one pre-determined rate of flow so as to derive a signal for controlling said fluid flow rate.

7. A method according to claim 1, comprising the step of displaying said flow rate on indicator means.

8. A method according to claim 1, comprising, the further step of deriving the total amount of fluid flowing past said aerial.

9. A method according to claim 8, wherein said total amount of fluid is compared with a predetermined amount of fluid so as to derive a signal for controlling said fluid flow rate.

10. A method according to claim 9, wherein said control signal is effective to stop the fluid flow.

11. A method according to claim 10, wherein said control signal is effective to reduce the fluid flow rate.

12. Apparatus for monitoring the flow of fluid, comprising a dielectric aerial mounted in direct contact with the flowing fluid for directing microwave radiation into said fluid in a direction having a substantial component parallel to the direction of relative movement between the aerial and the fluid and for receiving microwave radiation reflected from said fluid, means for supplying microwave radiation to said aerial, and means for detecting said reflected microwave radiation received by said aerial, said detection means deriving a Doppler frequency signal from said detected radiation as a measure of the rate of flow of said fluid relative to said aerial.

13. An apparatus according to claim 12, comprising means for conducting the flow of fluid.

14. An apparatus according to claim 13, wherein said aerial is mounted on said means, to form part of a boundary wall thereof.

15. An apparatus according to claim 13, wherein said aerial is disposed within said means so as, in use, to be totally immersed in the fluid.

16. An apparatus according to claim 13, wherein the aerial forms part of said fluid conducting means.

17. An apparatus according to claim 16, wherein said fluid flow conducting means comprises a passageway extending through said aerial.

18. An apparatus according to claim 12, comprising means for generating microwave signals and for passing said signals to said aerial supply means.

19. An apparatus according to claim 12, wherein the signal detection means comprises means for displaying said flow rate.

20. An apparatus according to claim 12, comprising means for comparing said fluid flow rate with at least one predetermined flow rate, and means for deriving a difference signal therebetween for application to means for controlling said flow rate.

21. An apparatus according to claim 20, comprising means operable by said difference control signal to vary the flow rate of the fluid.

22. An apparatus according to claim 12, comprising means for determining the instantaneous total amount of fluid that has flowed past said aerial.

23. An apparatus according to claim 22, comprising means for comparing said total amount of fluid with a predetermined amount, and means for deriving a difference signal therebetween for controlling flow of fluid.

24. An apparatus according to claim 23, comprising means operable by said difference control signal for shutting off said flow.

25. An apparatus according to claim 23, comprising means operable by said difference control signal to vary the flow rate of the fluid.

26. A method of monitoring the flow of a dielectric liquid within an enclosed pipe, wherein a dielectric microwave aerial is disposed in the pipe to form part of an internal wall thereof in direct contact with the liquid, comprising supplying microwave signals to said aerial for radiating into the liquid in a direction having a substantial component parallel to the direction of relative movement between the aerial and the liquid, receiving said signals by said aerial on reflection from the liquid, and conducting said signals to a detection circuit for deriving a Doppler frequency signal as a measure of the rate of flow of the liquid in the pipe.

* * * * *